(12) United States Patent
Tripathi et al.

(10) Patent No.: US 12,445,571 B1
(45) Date of Patent: Oct. 14, 2025

(54) SYSTEMS AND METHODS FOR AUTOMATIC ASPECT RATIO ADJUSTMENT FOR VIDEO CONTENT

(71) Applicant: Amazon Technologies, Inc., Seattle, WA (US)

(72) Inventors: Rohun Tripathi, Seattle, WA (US); Baris Gecer, Post (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/675,852

(22) Filed: May 28, 2024

(51) Int. Cl.
*H04N 7/01* (2006.01)
*G06V 10/75* (2022.01)
*G06V 20/40* (2022.01)
*H04N 5/265* (2006.01)

(52) U.S. Cl.
CPC ......... *H04N 7/0122* (2013.01); *G06V 10/751* (2022.01); *G06V 20/49* (2022.01); *H04N 5/265* (2013.01)

(58) Field of Classification Search
CPC ...... H04N 7/01; H04N 7/0122; H04N 7/0117; H04N 7/0127; H04N 5/265; G06V 20/49; G06V 10/751
USPC ........ 348/441, 445, 458, 459; 382/282, 283, 382/298, 300; 345/626, 629, 630
See application file for complete search history.

(56) References Cited

U.S. PATENT DOCUMENTS

| | | | |
|---|---|---|---|
| 6,771,888 B1 * | 8/2004 | Cookson ................ | G11B 27/10 |
| 2011/0279641 A1 * | 11/2011 | Wang .................... | G06T 7/215 |
| | | | 348/E13.001 |
| 2024/0153228 A1 * | 5/2024 | Liu ........................ | G06V 20/49 |

* cited by examiner

*Primary Examiner* — Sherrie Hsia
(74) *Attorney, Agent, or Firm* — Eversheds Sutherland (US) LLP

(57) ABSTRACT

Systems and methods are provided for automatic aspect ratio adjustment for video content. The system receives video content formatted in a first aspect ratio that is desired to be converted into a different aspect ratio. The video content is separated into segments, with each segment representing a different camera cut. A representative video frame from each segment is selected and fit to a canvas that is sized to the desired aspect ratio. The canvas is then provided to a generative AI model that is configured to "de-noise" the pixels of the canvas located around the boundaries of the original video frame. This de-noising process modifies the pixels such that they more closely resemble a natural continuation of the original video frame. The final output is a modified video frame at the new aspect ratio that is less likely to provide the appearance of a modified video frame than conventional methods for adjusting the aspect ratio of video content.

20 Claims, 10 Drawing Sheets

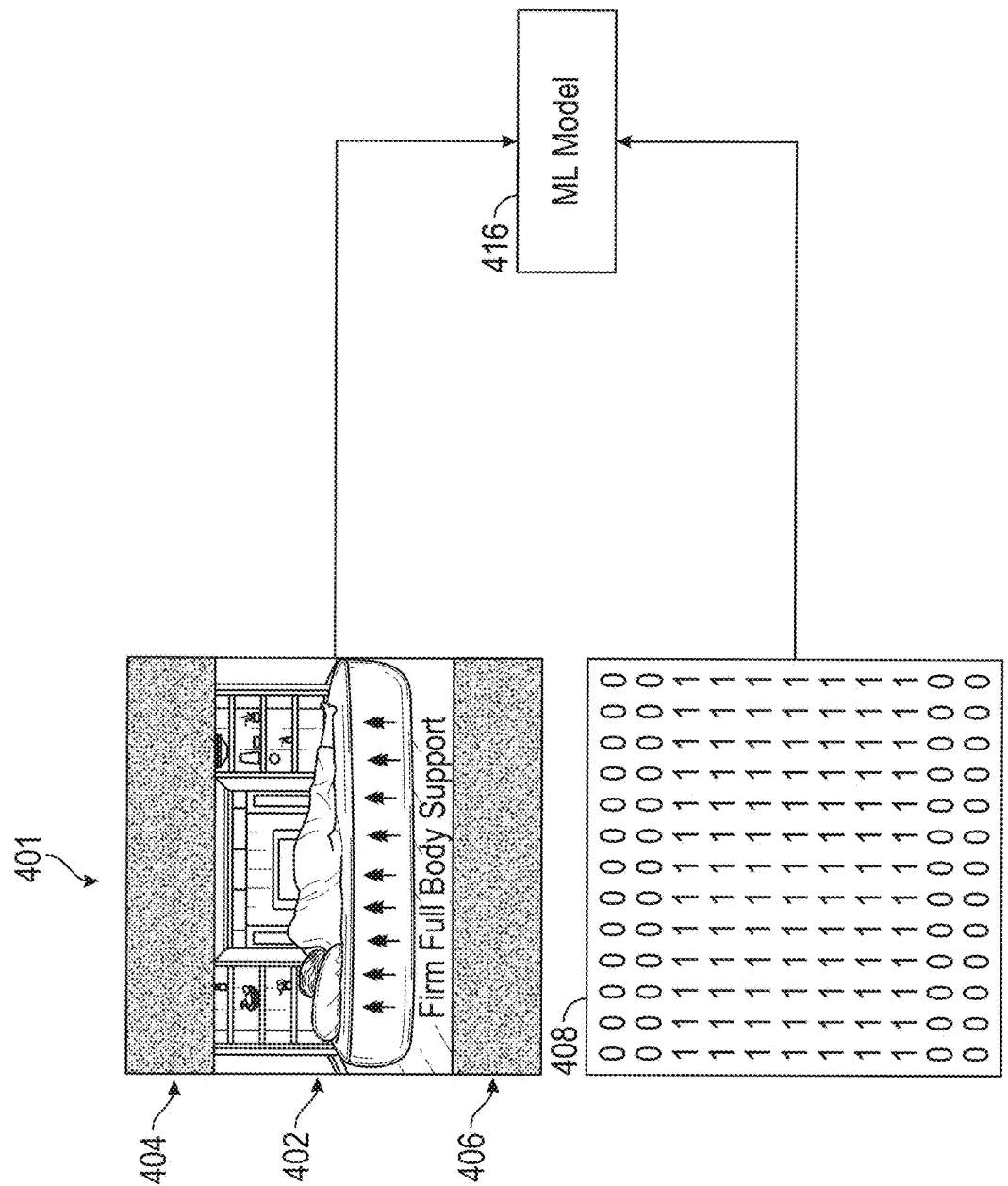

SYSTEMS AND METHODS FOR AUTOMATIC ASPECT RATIO ADJUSTMENT FOR VIDEO CONTENT

BACKGROUND

Video content may be presented to users via a variety of different platforms that are associated with different aspect ratios (and other parameters relating to the presentation of the video content). For example, video content presented via a website with a landscape orientation leads to a poor customer experience when delivered on a smartphone application in a portrait view. Altering video content originally developed for consumption on a website to video content for consumption on a smartphone using re-shoots is an expensive and time-consuming process. As another example, a first website may have a space of a dedicated first size for presenting a video and a second website may have a space of a dedicated second size for presenting a video. As a result, oftentimes, the original video content is simply stretched or cut to fit the different aspect ratio, providing for a poor consumer experience in viewing the modified video content.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depending on the context, encompass a plural number of such components or elements and vice versa.

FIGS. 4A-4B depict an outpainting process performed by a machine learning model, in accordance with one or more example embodiments of the disclosure.

DETAILED DESCRIPTION

This disclosure relates to, among other things, systems and methods for automatic aspect ratio adjustments for video content. Particularly, the system and methods provide for an improved approach to modify video content from a first aspect ratio to a second aspect ratio without hindering the quality of the video content. For example, video content may be originally intended for presentation to a user via a website in a landscape orientation may be modified for presentation to a user via a smartphone application in a portrait orientation. As another example, the aspect ratio for video content may be modified for presentation on different websites that provide different space allocations on the website for presentation of the video content. These modifications are merely exemplary, and the video content may also be modified for any other purpose as well. Additionally, while, in some instances, reference is specifically made to adjustments to the aspect ratio of video frames of video content or a single image, this is not intended to be limiting, and the same approach also may be applicable to any other type of modification (for example, any other type of size modification or any other modification in general).

Figure 1A:
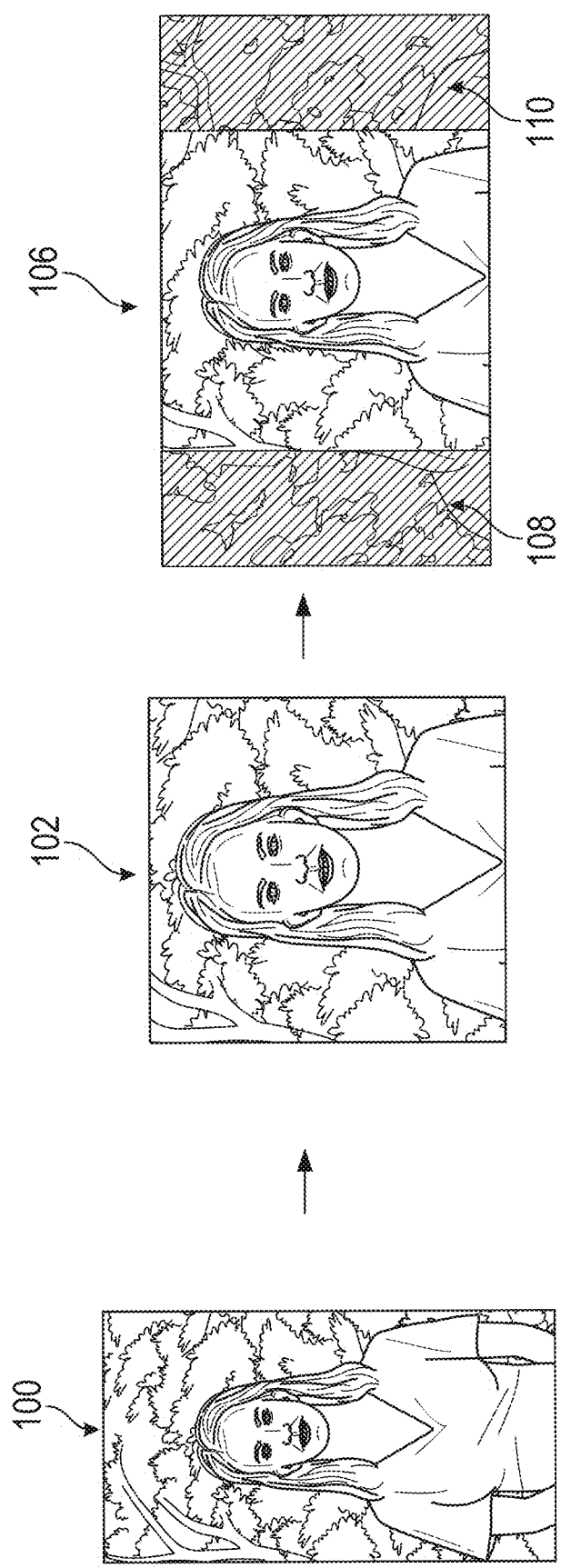
FIGS. 1A-1B depict different approaches for automatic aspect ratio adjustment for video content, in accordance with one or more example embodiments of the disclosure.

Conventionally, to modify video content in this manner, the original video content is "stretched," or portions of the video content are removed to resize the original video content. This approach, however, leads to lower quality video content. Another conventional approach involves adding pixels around the boundaries of the video frames forming the video content if the new desired size of the video content is greater than the original size of the video content. These pixels are typically provided as blurred versions of existing pixels included in the original frames of the video content (this is shown in FIG. 1A). This, however, results in video content that is clearly identifiable by a user as being modified to a different size as the added pixels do not provide the appearance of being a natural continuation of the existing pixels.

Figure 1B:
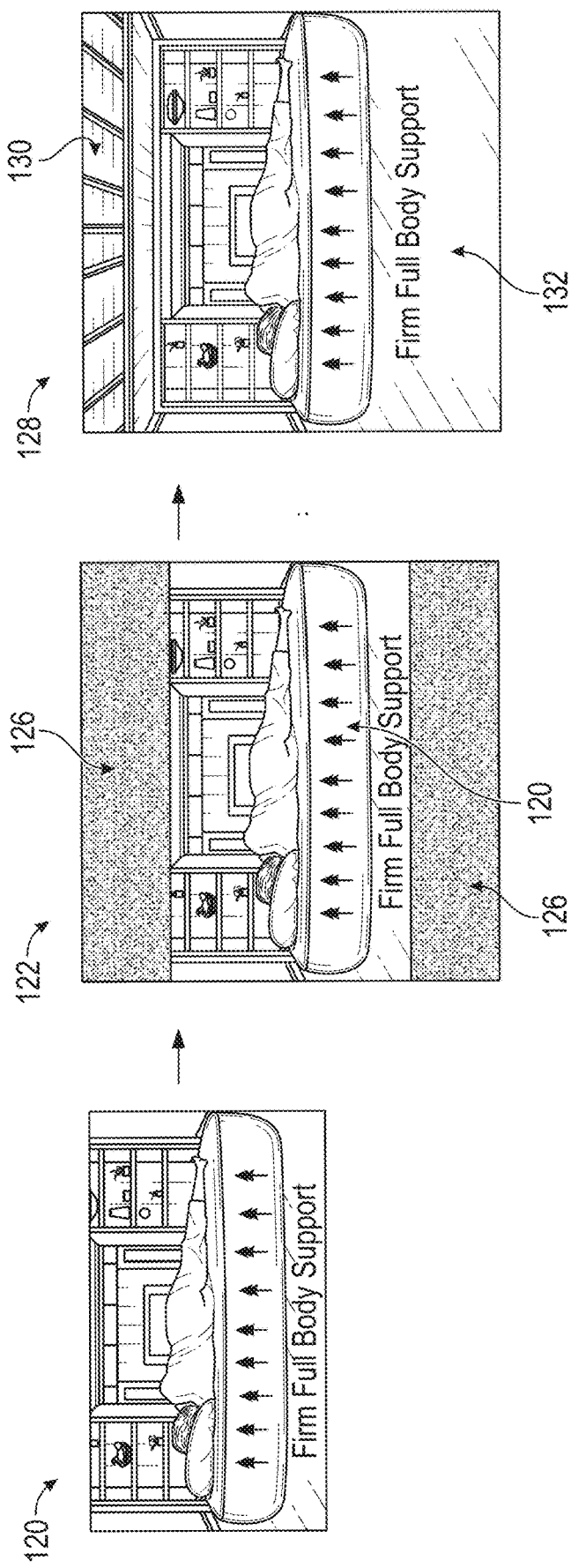

In contrast with these conventional approaches that result in lower quality resized video content, the systems and methods described herein provide an improved approach for performing this resized without sacrificing video quality. This improved approach generally entails producing a "canvas" of pixels at the desired aspect ratio, overlaying a representative video frame of the video content on the canvas, and using a generative artificial intelligence (AI) model (such as a stable diffusion model or any other type of generative model) to modify the remaining pixels to provide the appearance of extensions of the content of the original frames in a process referred to as "outpainting" (as shown in FIG. 1B). By using this approach, a user is less likely to be able to identify that the video content at the new aspect ratio was synthetically modified to fit the new aspect ratio, providing higher quality video content.

More particularly, the improved approach described herein involves two aspects: video content segmentation and video outpainting. The video content segmentation involves separating the video content into multiple segments, with each segment representing a different camera cut of the video content. Once the segments are identified, particular segments may be identified in which camera is static or relatively static. This is because it may be less computationally complex to modify video frames that do not include dynamically changing pixels (a non-static camera cut). However, while reference may be made herein to specifically selecting segments including static camera cuts, segments including dynamic camera cuts may also be used in some instances.

These segments including static camera cuts may be identified by comparing pixels forming the borders of the video frames included in the segment. If a difference between corresponding pixels in different video frames is less than a threshold amount, it may be determined that the camera is sufficiently static to use the segment. These segments are then selected for modification to the different aspect ratio.

In embodiments, the pixel comparison to identify static camera cuts may more specifically involve comparison of pixels included in a "border" of the video frames. The border pixels may be identified as a given number of pixels extending inward into the video frame from the boundaries of the video frame (as a non-limiting example, the pixels at the boundary of the video frames and ten pixels extending from the boundary inward toward the center of the video frame). The border pixels may be used as the point of comparison because any pixels that are added through the outpainting are likely to be adjacent to the border pixels, so it is more critical that the outpainted pixels are similar to the existing border pixels. However, any other combinations of pixels may be used for this comparison as well.

Once the segments including static video frames are identified, the outpainting process may be performed. Generally, outpainting is an image processing methodology that entails generating new content outside of the boundaries of an existing image. As a part of the outpainting process, the canvas that is sized to the desired aspect ratio for the video content may be created. The canvas includes "noise" pixels that are unrelated to the content of the video frames. For example, the canvas may be initially set to include pixels that are all black or any other pixel color. The pixels of an original video frame are then overlaid on the canvas such that the canvas then includes the pixels of the video frame and the noise pixels surrounding the pixels of the video frame and filling in the remainder of the space of the canvas.

However, it is undesirable to simply provide video content including the original video frame and noise pixels around the pixels of the video frame. Instead, the noise pixels included in the canvas may be modified such that they provide the appearance of being natural continuations of the existing pixels in the original video frame. This is accomplished by providing the canvas including the video frames to the generative AI model. The goal of the generative AI model is to reduce the noise in the received video frames such that the difference between the noise pixels and the adjacent pixels on the border of the original video frame is minimized.

A mask may also be generated and provided to the generative AI model as an input along with the canvas including the video frame. The mask may be a matrix of numerical values (or any other types of information) that may be used to identify the locations in the canvas of pixels corresponding to the original video frame and locations in the canvas corresponding to the noise pixels. As a non-limiting example, the matrix may include entries for each of the pixels in the canvas and values of "1" may be used to indicate pixels associated with the original video frame and values of "0" may be used to indicate noise pixels of the canvas.

Using the canvas (including the pixels of the original video frame) and the mask, the generative AI model may generate an output video frame including modified noise pixels that more closely resemble the pixels at the border of the original video frames. However, the generative AI model may also perform "de-noising" of the pixels in the original video frame as well, which is undesirable. Therefore, the output of the generative AI model is overlaid with the original video frame such that the pixel values of the original video frame are still maintained in the output of the generative AI model. The initial output of the generative AI model may not necessarily include fully de-noised noise pixels. Accordingly, this process of overlaying the original video frame on the output of the generative AI model and providing the output back as an input to the generative AI model may be iterated until the noise pixels in an output of the generative AI model closely resemble the pixels at the border of the original video frames. In some instances, this may involve the process being iterated a pre-determined number of times (however, the number of iterations may also be dynamic and change depending on any number of factors). The resulting video frames may be combined together to form new video content at the desired aspect ratio. The same approach may be used to combine different video content of varying aspect ratios into single video content at a given aspect ratio.

Although reference may be made to processing video content herein, the same approach may be applicable to processing single images rather than multiple video frames as well (or vice versa).

Turning to the figures, FIGS. 1A-1B depict different approaches for automatic aspect ratio adjustment for video content. Beginning with FIG. 1A, a conventional approach to modifying video content is shown. In this example, it is desired for video content originally presented in an aspect ratio in a vertical orientation to be converted into video content presented in an aspect ratio in a horizontal orientation. FIG. 1A provides an example of a conversion process for a single video frame 100 of the plurality of video frames that form the original video content. Initially, a portion of the top of the original video frame 100 and a portion of the bottom of the original video frame 100 are removed to produce modified video frame 102. Then, a second modified video frame 106 is produced. In the second modified video frame 106, first pixels 108 are added to the left of the second modified video frame 106 and second pixels 110 are added to the right of the second modified video frame 106.

The result of this process is that the second modified video frame 106 is of the desired aspect ratio in the horizontal orientation. However, the first pixels 108 and second pixels 110 that are added to provide the second modified video frame 106 at the desired aspect ratio are blurred versions of existing pixels in the modified video frame 102. This provides a lower quality video frame as the first pixels 108 and second pixels 110 are not continuous extensions of the existing pixels and are clearly identifiable by a user as being added to the video content.

Turning to FIG. 1B, the improved approach for modifying video content as described herein is shown. In this example, it is desired for video content provided at a first aspect ratio to be modified into to a second aspect ratio that includes more pixels in the vertical direction (e.g., additional pixels above and below the original top and bottom borders of the video content).

FIG. 1B provides an example of a conversion process for a single video frame 120 of the video frames forming the original video content. Initially, a canvas 122 is generated at the desired aspect ratio. The canvas 122 includes a set of noise pixels 126 and is overlaid with the video frame 120 of the original video content. The resulting frame includes the video frame 120 surrounded by noise pixels 126. Although the example shows the video frame 120 being provided in the middle of the canvas 122, this is not intended to be limiting, and the video frame 120 may be provided at an offset from the center of the canvas 122 at any other position on the canvas 122 as well. The noise pixels 126 may be any pixels values that serve as placeholders to later be modified by the generative AI model. For example, the noise pixels 126 shown in FIG. 1B are pixels with values that result in black colors, however, any other pixel values may be used.

In some instances, the noise pixels 126 may not necessarily simply be colors that are unrelated to the content of the video frame 120 of the original video content. For example, different pre-determined noise pixel "themes" may be stored and added as the noise pixels 126 depending on the content of the video frame 120 of the original video content. With respect to the example shown in FIG. 1B, one theme may be pixels depicting a home interior, and these pixels may be added as the noise pixels 126. By using these "themes" that more closely represent the content in the video frame 120 of the original video content, the noise pixels 126 may more accurately influence the generation of the desires outpainted pixels by the machine learning model. Additionally, some types of models may not necessarily require noise pixels 126 to generate the outpainted pixels and the video frame 120 of the original video content may be provided to the machine learning model without any noise pixels 126.

As aforementioned, the canvas 122 is provided to a generative AI model (a mask may also be provided as an input to the generative AI model as well). The generative AI model generate an output video frame 128 in which the noise pixels 126 are "de-noised" such that they are provided the appearance of being associated with the original video frame 120. For example, a first portion 130 of the output video frame 128 has the appearance of a ceiling in the room shown in the original video frame 120, and a second portion 132 of the output video frame 128 has the appearance of an extension of the carpet shown in the original video frame 120. The first portion 130 and the second portion 132 are generated by the generative AI model and provided in place of the noise pixels 126. Similar to the second modified video frame 106 produced in the conventional approach of FIG. 1A, the output video frame 128 shown in FIG. 1B is of the desired aspect ratio. However, the output video frame 128 of higher quality than the second modified video frame 106 in that a user is less likely to be able to discern that the added pixels in the output video frame 128 were added to the original video content (the added pixels provide a natural visual continuation of the existing pixels and provide the appearance that they were originally included in the original video content).

Figure 2:
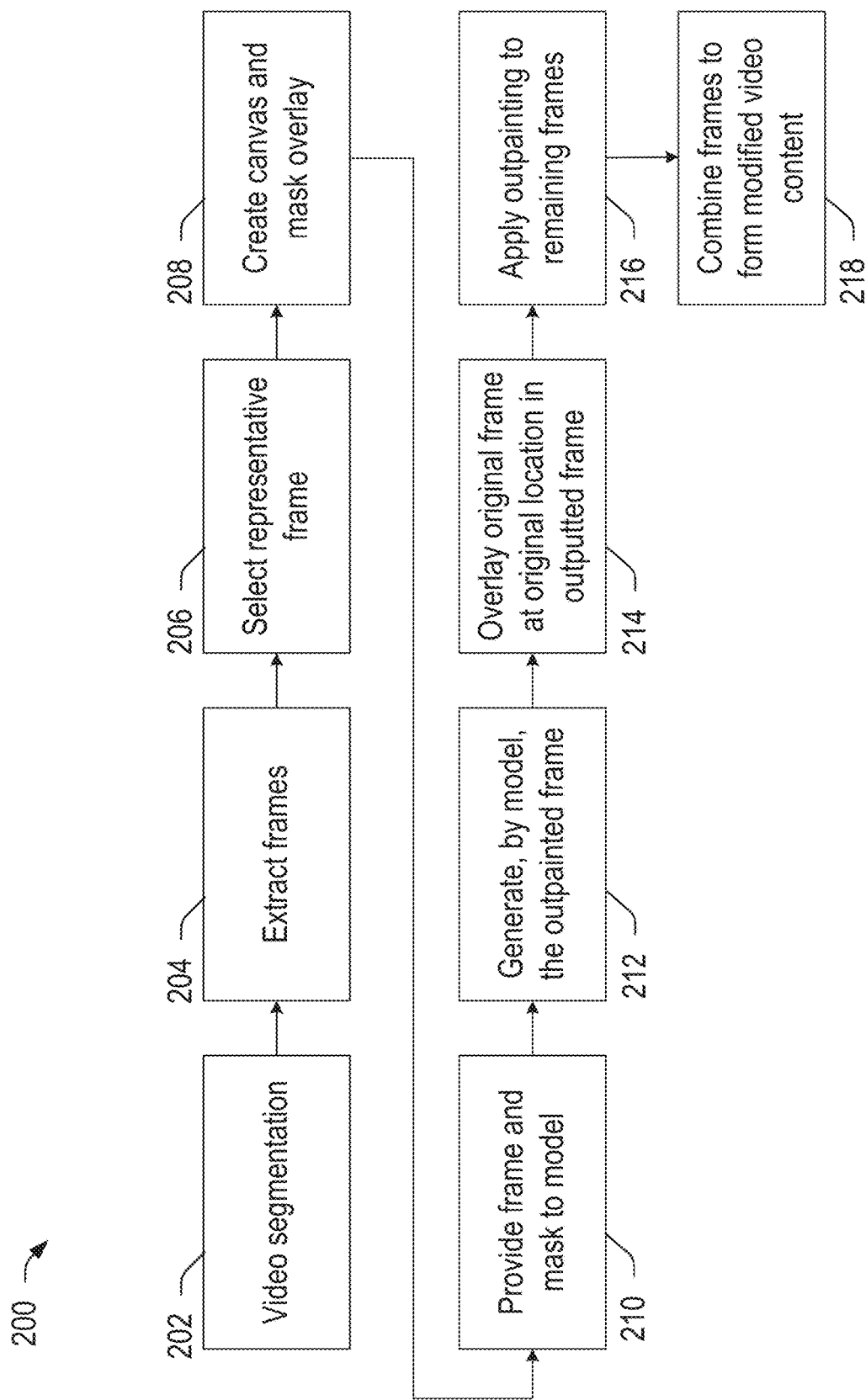
FIG. 2 depicts a flow diagram for automatic aspect ratio adjustment for video content, in accordance with one or more example embodiments of the disclosure.

FIG. 2 depicts a flow diagram 200 for automatic aspect ratio adjustment for video content. The flow diagram 200 illustrates some of the high-level operations associated with modification of an existing video in first aspect ratio into a high-quality modified version of the existing video in a second aspect ratio (or preforming any other modifications to the size of the video content or any other types of modifications in general).

Operation 202 of the flow diagram 200 involves performing video segmentation. In embodiments, the segmentation may involve separating the video content into different segments, with each segments including a different camera cut. The segmentation may be performed based on camera cuts because the video frames including static camera cuts may be used to generate the new video content at the modified aspect ratio. In some instances, however, video frames associated with dynamic camera cuts (for example, camera cuts in which the camera is moving) may also be used. Additionally, the segments are not necessarily limited to being based on camera cuts but may also be produced based on any number of different factors.

For a given segment, operation 204 involves extracting individual video frames from the segment. Operation 206 involves selecting a representative frame of the video frames for that segment. That is, rather than performing outpaining on all of the video frames forming the segment, which may introduce latency into the process, the outpaining may be performed on the representative frame and the same outpainted pixels may later be added to some or all of the other video frames of the segment.

However, in some instances, the outpainting may still be performed on multiple or all of the video frames instead of performing the outpaining on only a single representative video frame. For example, rather than only performing outpainting on one of the video frames and then adding the outpainted pixels to the other frames of the video segment, a first frame and a last frame may be outpainted and interpolation may be used for the generation of the remaining video frames in the video segment. Any other number of frames at any position in the video segment may also be outpainted.

Figure 3:
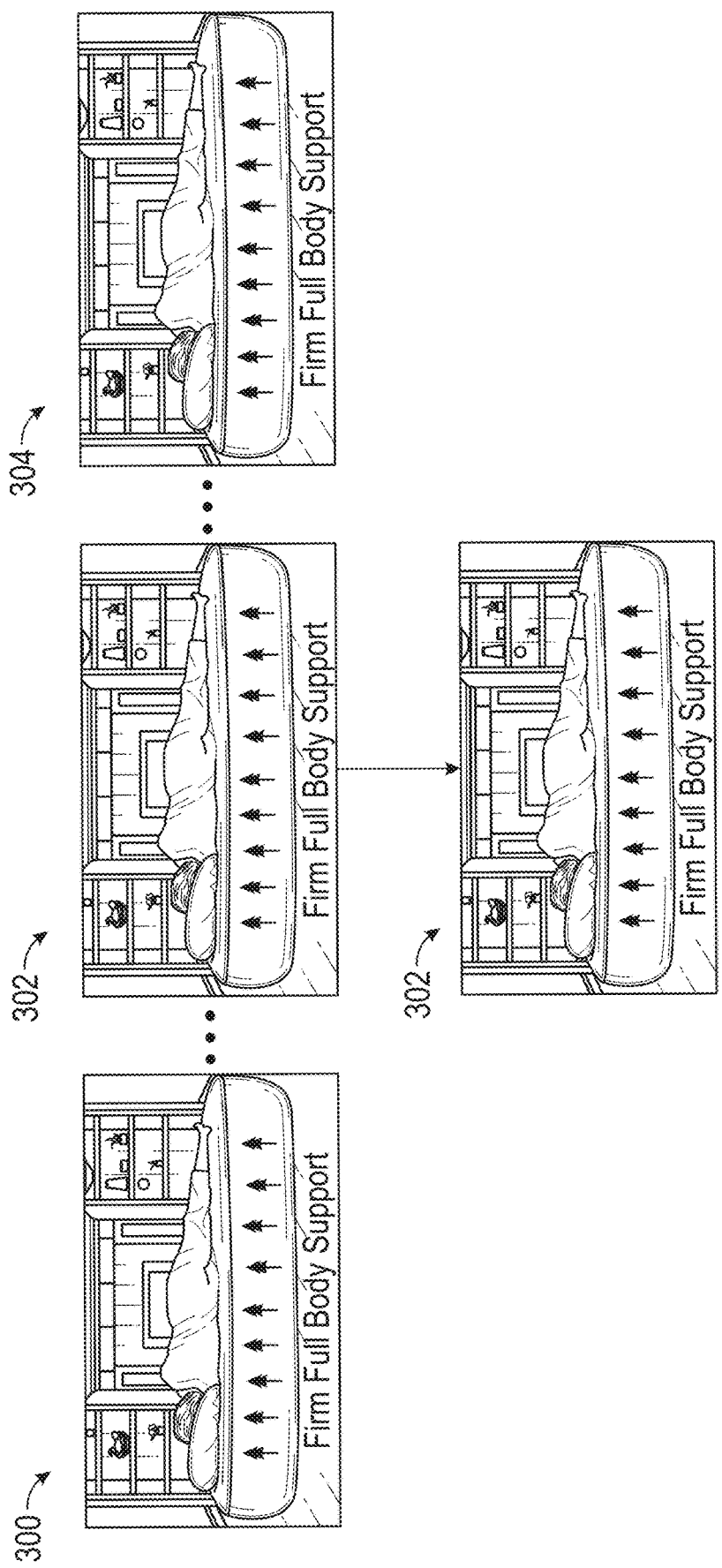
FIG. 3 depicts a frame extraction process, in accordance with one or more example embodiments of the disclosure.

In embodiments, selecting the representative frame may specifically involve selecting the "middle" video frame of the video frames in the segment. The segment includes a series of video frames that, when combined, form the video content included in that segment. A first video frame of the video frames includes the content that is shown first and a last video frame of the segment includes the content that is shown last in that particular segment. The middle video frame in this case would be the video frame that is presented halfway through the video content included in the segment. This process of selecting the representative frame is visually exemplified in FIG. 3. FIG. 3 shows a series of video frames (for example, a first video frame 300, second video frame 302, and third video frame 304) that together may form a segment of video content. Although there are three video frames, as shown in the figure; a segment of a video content may also include any other number of video frames. In this example, the second video frame 302 may be identified as the middle video frame of the segment and may thus be used as the representative video frame for outpainting by the machine learning model.

The middle video frame may be identified in a number of different manners, such as identifying a total time length of the video segment and selecting the video frame that aligns with a halfway point within that total time length and/or determining a number of video frame included in the segment and diving the total number of video frames by two, with the resulting number representing the number associated with the middle video frame in the sequence (for example, the first video frame is associated with the numerical value of "1"). In this second example method, if the resulting number is not a whole number, the number may be rounded up and/or down, and one of the resulting video frames may be selected.

The middle video frame is specifically selected based on the assumption that the pixel differences between the middle video frame and any other video frame in the segment are likely to be the least significant overall when compared to other video frames in the segment. For example, if the last video frame is selected, then it may potentially have a large pixel difference with respect to the first video frame. This is because the number of frames between the first and last video frame is larger than the distance between the middle video frame and any other video frame in the segment.

Although reference is made specifically to the selection of the middle video frame, in some instances it may be desirable to use another video frame as the representative video frame as well. The middle video frame may not necessarily always represent the least different frame between the remainder of the video frames in the video segment. For example, the middle video frame may include an artifact or other abnormality that may cause the middle video frame to exhibit a greater difference than other video frames in the video segment.

Optionally, different types of methods may be used to determine if the middle video frame is to be selected as the representative video frame. As one example, average values for some or all of the video frames in the segment may be determined and the values in the middle video frame (and/or the other video frames in the segment) may be compared to the average to determine which video frame is the least different from the average. The video frame with the least difference may then be selected as the representative video frame. Other statistical data (besides the average) may also be used as well (for example, median, etc.).

Returning to FIG. 2, once the representative video frame is identified, operation 208 involves creating a canvas and mask overlay (also generally referred to herein as a "mask") to be provided as inputs to a machine learning model to perform the outpainting.

The canvas (which may be the same as canvas 122 or any other canvas or canvases described herein) is an image that is created to be sized to the desired new aspect ratio for the original video content. The canvas initially comprises a series of "noise" pixels, which are pixels of values that are unrelated to the content of the original video frames of the video content. For example, all of the pixels may be set to a black color or any other consistent color value (however, the noise pixels do not necessarily all need to be the same value). The representative video frame is then overlaid on the canvas such that the canvas then includes the video frames and the noise pixels surrounding the video frames filling in the remainder of the space to form the video frame of the desired new aspect ratio. For example, "overlaying" the representative video frame may simply mean replacing the noise pixels values in that location with the pixel values of the representative video frame. Alternatively, generating the canvas may also involve starting from the representative video frame and adding pixels to the boundary of the representative video frame until the resulting canvas is at the desired aspect ratio.

Turning to FIG. 4A as an example, a canvas 401 is shown including noise pixels and a representative video frame 402 overlaid on the canvas 401. For example, a first group of noise pixels 404 is shown as being located above the representative video frame 402 and a second group of noise pixels 406 is shown as being located below the representative video frame 402. The representative video frame 402 is provided at the original aspect ratio of the video content, and the noise pixels of the canvas represent the additional pixel space that is desired to be filled to bring the video content to the new aspect ratio shown by the size of the canvas 401.

The mask may be a matrix of numerical values that may be used to identify the locations in the canvas of pixels corresponding to the existing representative video frame and locations in the canvas corresponding the noise pixels. That is, there may be an equal number of entries in the matrix forming the mask as there are pixels in the canvas with each entry providing information about the corresponding pixel in the canvas. However, this one-to-one relationship may not always be used, and any other number of entries may be provided in the matrix. For example, a smaller number of entries may be included in the mask with each entry providing information about a group of pixels in the canvas.

Turning back to FIG. 4A as an example, a mask 408 that corresponds to canvas 401 is shown. The mask 408 is shown as including a first group of "0" numerical values provided in matrix entries indicating pixel locations in the canvas 401 corresponding to noise pixels 404 provided above the representative video frame 402. The mask 408 is also shown as including a second group of "0" numerical values provided in the matrix entries indicating pixel locations in the canvas 401 corresponding to noise pixels 406 provided below the representative video frame 402. Further, the mask 408 is also shown as including a group of "1" numerical values provided in the matrix entries indicating pixel locations in the canvas 401 corresponding to the representative video frame 402.

This mask 408 is merely exemplary and intended to represent the pixels in the exemplary canvas 401, and the mask may also include "1" and "0" values in other locations in the matrix depending on the size and shape of the representative video frame and the desired aspect ratio of the new video frame. For example, if the desired aspect ratio requires additional pixels to be added to the left and right of a representative video frame, then the canvas may include noise pixels to the left and right of the representative video frame and the corresponding mask may also include "0" values on the left and right in the matrix.

Additionally, while reference is made to "1" values representing locations of pixels corresponding to the original representative video frame and "0" values representing locations of pixels corresponding to the noise pixels associated with the canvas (e.g., pixel locations not including the pixels of the representative video frame), any other numerical values may also be used to represent these different pixel locations.

Further, the illustration of numerical values as being provided in the matrix entries of the mask is also not intended to be limiting and any other types of information may be provided in the entries to provide indications of the types of pixels included in the corresponding canvas. For example, rather than being numerical values, the entries may include Booleans or indications or Booleans, text-based information, etc.

Finally, FIG. 4A shows that the canvas 401 and the mask 408 are provided to the machine learning model 416 as inputs (shown as operation 210 in FIG. 2) such that the machine learning model 416 may then perform outpainting on the representative video frame 401.

Returning to FIG. 2, operation 212 involves generating by the machine learning model, the outpainting frame. For example, the machine learning model may be a generative model, such as a stable diffusion model, or any other type of model. Operation 214 then involves overlaying the original video frame at its original location within the modified video frame output by the machine learning model. This process is further illustrated in FIG. 4B.

Figure 4B:
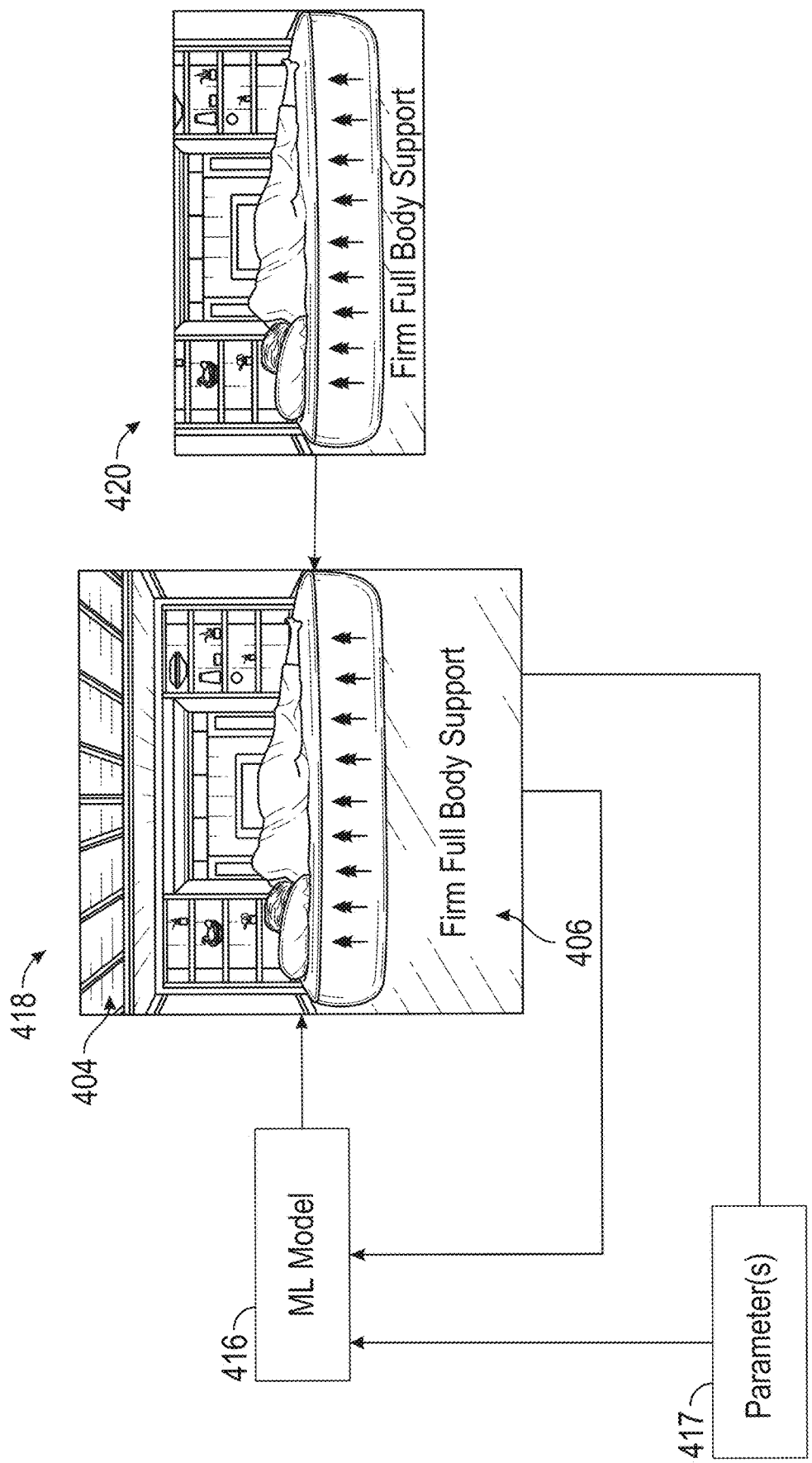

As shown in FIG. 4B, the machine learning model 416 (which may be the same as machine learning model 706 or any other machine learning model described herein) may use the canvas 401 and the mask 408 that are provided as input (along with any other information that is provided as an input) to generate an output video frame 418. The output video frame 418 generated by the machine learning model 416 includes modified noise pixels that more closely resemble the pixels at the border of the original video frames. For example, the first group of noise pixels 404 is shown as being modified by the machine learning model 416 to more closely resemble a natural continuation of the pixels forming a top border of the representative video frame 420. For example, the first group of noise pixels 404 is shown as being modified to more closely resemble a ceiling that may be located above the air mattress shown in the representative video frame 420. The second group of noise pixels 406 is shown as being modified by the machine learning model 416 to more closely resemble a natural continuation of the pixels forming a bottom border of the representative video frame 420. For example, the second group of noise pixels 406 is shown as being modified to more closely resemble a continuation of the carpet shown in the representative video frame 420.

The machine learning model 416 may not necessarily be able to produce an output image with modified pixels that provide a natural continuation of the representative video frame 420. Instead, the machine learning model 416 may need to undertake an iterative process by which output images are generated and those output images are provided back to the machine learning model 416 as inputs to provide further refinement of the noise pixels until eventually the noise pixels closely resemble a natural continuation of the pixels in the representative video frame 420. In some instances, the point at which the iterative process ceased may be based on a fixed number of iterations (for example, the machine learning model 416 may progress through a fixed number of 20 iterations or any other number of iterations).

However, the number of iterations may also be dynamic. For example the machine learning model (or another model or system, or even a user) may perform a verification of the output image generated by the machine learning model 416 to determine if the noise pixels have been modified to be with a threshold resemblance of the pixels included in the original representative video frame. For example, the verification may involve determining a degree of change (change in pixel values, average pixel values, etc.) between the previous image provided to the machine learning model 416 and the current output. The outputs of the machine learning model 416 may start with a greater difference and may converge toward zero or a smaller difference between input and output frames with each subsequent iteration. Thus, the difference may be compared to a threshold. When the difference is less than (or less than or equal to) the threshold, then the iterative process may cease.

To allow the machine learning model 416 to determine the stopping point, additional parameters 417 may be provided to the machine learning model 416 along with the output video frame 418. For example, the parameters may provide information about a number of iteration that have been performed (such as time step encoding information), a difference in pixel values as described above, and/or any other parameters that may be used for such purposes.

Although the machine learning model 416 performs "de-noising" of the noise pixels, this "de-noising" process may also be applied to the pixels of the original representative video frame as well, which is undesirable. Therefore, the output of the machine learning model 416 is overlaid with the original representative video frame such that the pixel values of the original representative video frame are still maintained in the output of the machine learning model 416.

Finally, returning to FIG. 2, operation 216 involves applying the outpainted pixels to any other video frames to be used in the new video content and operation 218 involves combining the video frames for the modified video content at the new size.

Figure 5A:
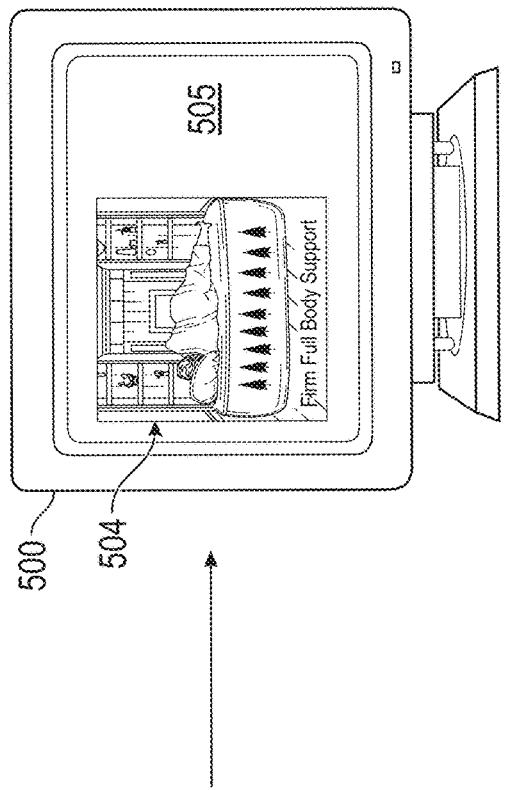
FIGS. 5A-5B depict an exemplary use case for automatic aspect ratio adjustment for video content, in accordance with one or more example embodiments of the disclosure.
Figure 5B:
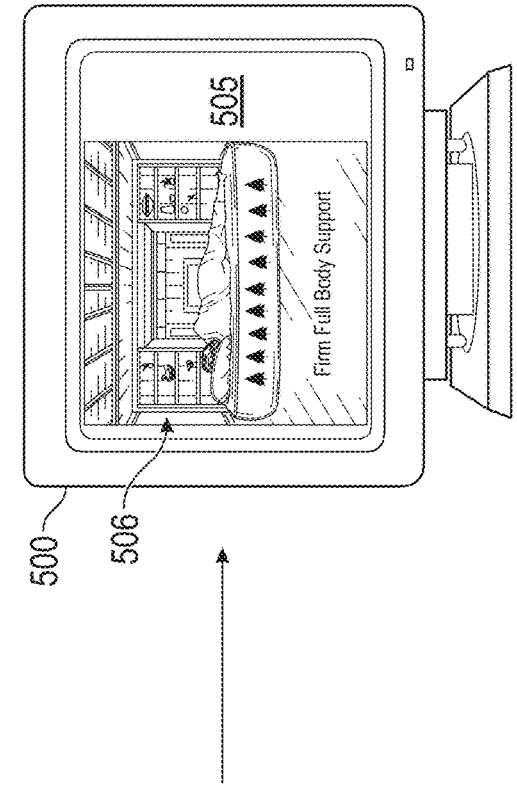

FIGS. 5A-5B depict an exemplary use case for automatic aspect ratio adjustment for video content. FIG. 5A illustrates a scenario in which video content is modified in a conventional manner to adjust the size of the video content. FIG. 5A shows a device 500 (for this particular example, the device 500 is shown as a television; however, any other type of device, such as a smartphone, tablet, desktop or laptop computer, e-reader, etc., may be applicable as well). On the left, the device 500 is shown as presenting original video content 502 at a first size via a first website. The same original video content 502 may also be presented on a second website 505 via the device 500. However, the space on the second website 505 that is allocated for the original video content 502 may be larger than the space allocated for the original video content 502 on the first website 503.

Conventionally, if this, or any other type of modification to the size of the original video content 502 is required, then the video content may be stretched (as shown on the right with the modified video content 504) or otherwise modified in a manner that results in reduced quality video content. As another example shown in FIG. 1A, new pixels may be added to the original video content 502 to accommodate the additional space; however, the pixels may be blurred versions of existing pixels and may not provide the appearance of a continuous extension of the original video content.

FIG. 5B shows the improved approach described herein. FIG. 5B shows that same device presenting the same original video content 502 via the first website 503 (shown on the left) and via the second website 505 (shown on the right). However, in contrast with the modified video content 504 shown in FIG. 5A that is stretched to fit in a larger space allocated for the video content on the second website 505, the modified video content 506 shown in FIG. 5B includes the original video content 502 that is supplemented with additional pixels above the top and bottom borders of the original video content 502.

FIGS. 5A-5B show only one exemplary use case for the improved approach for modifying video content as described herein. The same approach also may be applicable to any other use case in which it is desirable to modify the size of video content. As another nonlimiting example, the video content may be an advertisement. Different platforms via which the advertisement is presented (for example, a smartphone application, website, etc.) may have different size allocations for advertisement banners. The improved approach may be used to modify the size of the advertisement such that a high-quality version of the advertisement may be presented regardless of the size of the advertisement banner.

Figure 6:
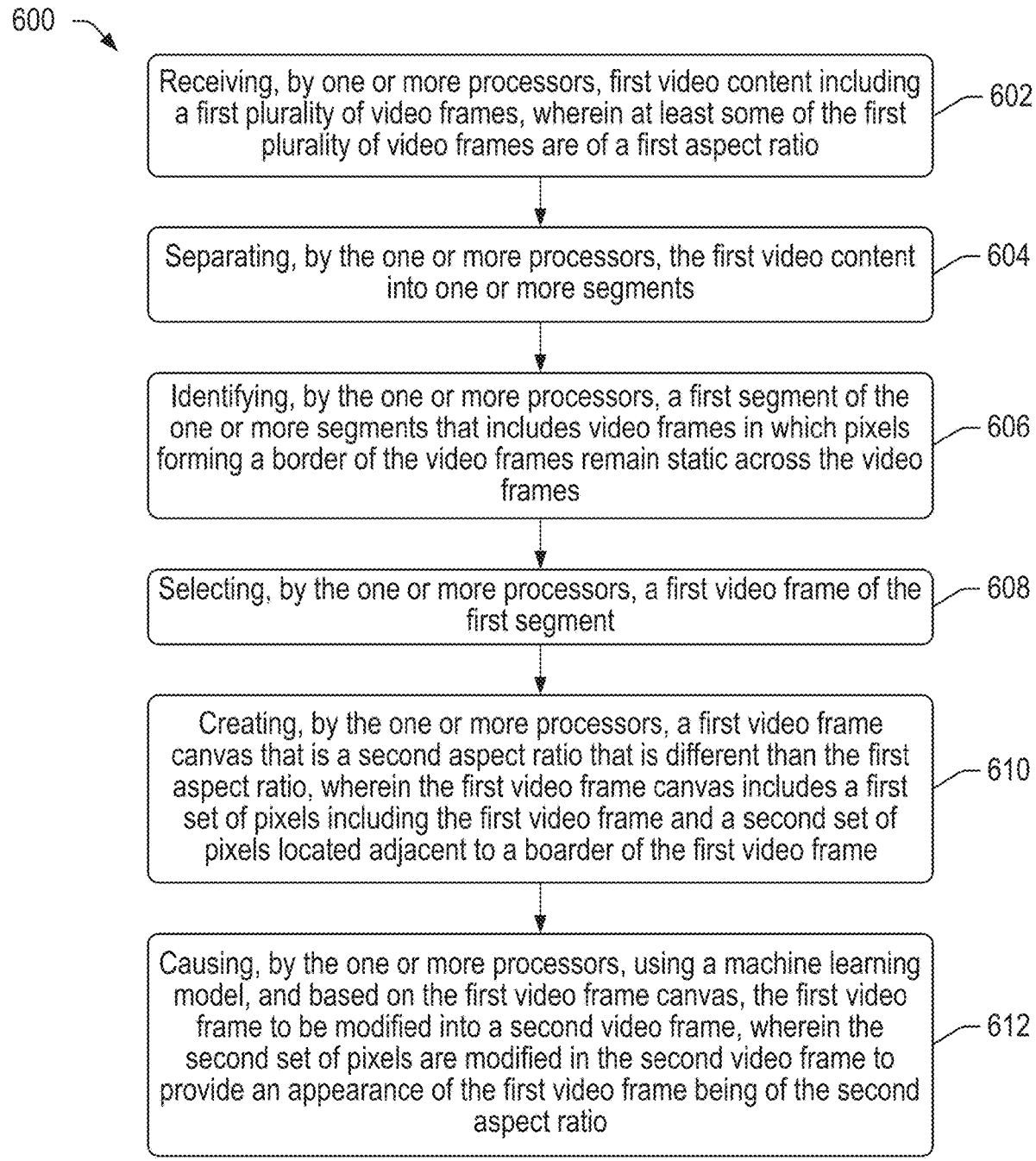
FIG. 6 depicts a method for automatic aspect ratio adjustment for video content, in accordance with one or more example embodiments of the disclosure.

FIG. 6 depicts an example method 600 for automatic aspect ratio adjustment for video content. Some or all of the blocks of the process flows or methods in this disclosure may be performed in a distributed manner across any number of devices or systems (for example, user device 702 computing system 704, etc.). The operations of the method 600 may be optional and may be performed in a different order.

At block 602 of the method 600, computer-executable instructions stored on a memory of a system or device may be executed to receive first video content including a first plurality of video frames; wherein at least some of the first plurality of video frames are of a first aspect ratio.

At block 604 of the method 600, computer-executable instructions stored on a memory of a system or device may be executed to separating, by the one or more processors, the first video content into one or more segments.

At block 606 of the method 600, computer-executable instructions stored on a memory of a system or device may be executed to identify, by the one or more processors, a first segment of the one or more segments that includes video frames in which pixels forming a border of the video frames remain static across the video frames. That is, the segments may be analyzed to identify segments including static camera cuts. In embodiments, this analysis may involve selecting a number of pixels located at the boundaries of one or more video frames included in the segment and designating those pixels as the border of the video frames (for example, 10 pixels inward from every edge (for example, top, bottom, left, and right) of a video frame. Once the border pixels are selected, the border pixels may be compared across the video frames in the segment to determine if the pixels change by more than a threshold amount. If the border pixels do not change by more than the threshold amount, then it may be ascertained that the segment includes a static camera cut. However, whether a segment includes a static camera cut may also be determined in any other suitable manner.

At block 608 of the method 600, computer-executable instructions stored on a memory of a system or device may be executed to select, by the one or more processors, a first video frame of the first segment. For example, as aforementioned, the first video frame may be a representative video frame of the segment that is provided to the machine learning model for outpainting. The first video frame that is selected may be the "middle" video frame of the video frames in the segment; however, this is not intended to be limiting and any other video frame may be selected as the representative video frame. Additionally, in some instances, multiple video frames may be selected to be provided to the machine learning model for outpainting.

At block 610 of the method 600, computer-executable instructions stored on a memory of a system or device may be executed to create, by the one or more processors, a first video frame canvas that is a second aspect ratio that is different than the first aspect ratio; wherein the first video frame canvas includes a first set of pixels including the first video frame and a second set of pixels located adjacent to a boarder of the first video frame. For example, the canvas may be the canvas 401 and/or any other canvas or canvases described herein or otherwise. As aforementioned, the canvas initially includes a series of "noise" pixels, which are pixels of values that are unrelated to the content of the original video frames of the video content. For example, all of the pixels may be set to a black color or any other consistent color value (however, the noise pixels do not necessarily all need to be the same value). The representative video frame is then added to the canvas such that some of the pixels are replaced with the pixels of the representative video frame (the first set of pixels may be the pixels of the representative video frame and the second set of pixels may be any remaining "noise" pixels in the canvas). Alternatively, the canvas may start with the representative video frame and other pixels may be added around the boundaries of the representative video frame to fill in the remaining pixel space to create the video frame at the new aspect ratio.

At block 612 of the method 600, computer-executable instructions stored on a memory of a system or device may be executed to cause, by the one or more processors, using a machine learning model (for example, machine learning model 416, machine learning model 706, etc.), and based on the first video frame canvas, the first video frame to be modified into a second video frame; wherein the second set of pixels are modified in the second video frame to provide an appearance of the first video frame being of the second aspect ratio. That is, the canvas including the representative video frame and the noise pixels filling in the remainder of the space may be provided to the machine learning model for outpainting. Other information may also be provided to the machine learning model to assist the model in this process. For example, a mask, such as mask 408 (and/or any other mask described herein or otherwise) may also be provided to the machine learning model 416. The mask may provide information about the locations of the pixels corresponding to the representative video frame and the locations of the noise pixels. Any other information may also be provided along with the mask as well.

The machine learning model may not necessarily be able to produce an output image with modified pixels that provide a natural continuation of the representative video frame. Thus, this process may be performed iteratively until the noise pixels in the output produced by the machine learning model closely resemble a natural continuation of the pixels in the representative video frame. This iterative process may be performed until a fixed number of iterations have been performed. The point at which the iterations cease also may be determined dynamically based on any number of factors, rather than being a fixed number of iterations.

Figure 7:
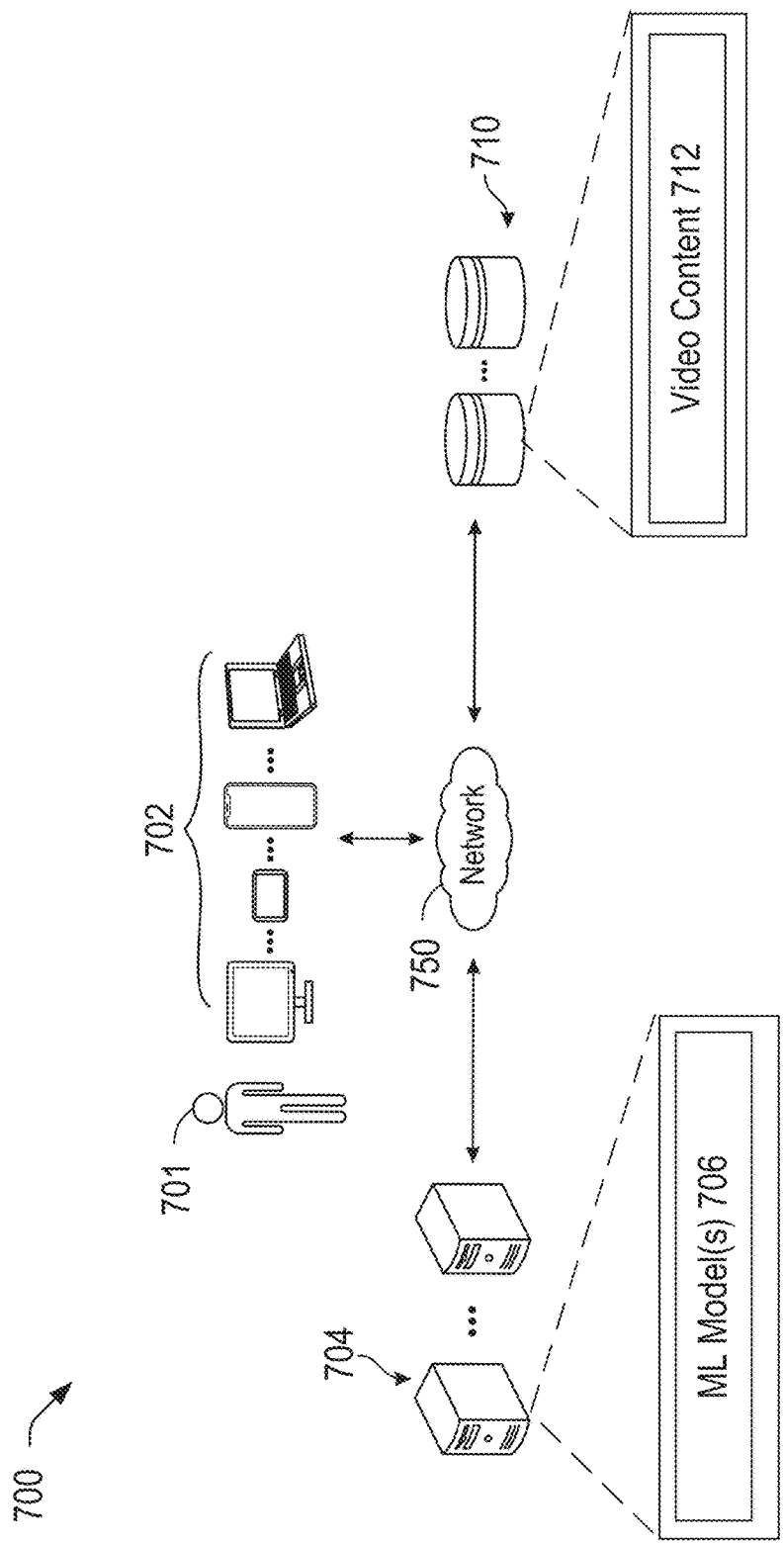
FIG. 7 depicts an example system for automatic aspect ratio adjustment for video content, in accordance with one or more example embodiments of the disclosure.

FIG. 7 is an example system 700 for automatic aspect ratio adjustment for video content. In one or more embodiments, the system may include one or more user devices 702 (which may be associated with one or more users 701), one or more computing systems 704, and/or one or more databases 710. However, these components of the system 700 are merely exemplary and are not intended to be limiting in any way. For simplicity, reference may be made hereinafter to user device 702, computing system 704, database 710, etc.; however, this is not intended to be limiting and may still refer to any number of such elements.

The user device 702 may be any type of device, such as an e-reader, personal assistant device, speaker, gaming console, smartphone, desktop computer, laptop computer, tablet, smart television (for example, a television with Internet connectivity, the capability to install applications, etc.), and/or any other type of device. The user device 702 may be used, for example, to view video content that may be presented in different aspect ratios.

Depending on the particular user device 702 that the user 701 is viewing certain video content, video content at an aspect ratio that is suitable for that device may be selected for presentation to a user. For example, different versions of the same video content at different aspect ratios suitable for the different devices may be pre-generated, and the video content at the aspect ratio that is suitable for the user device 702 may be selected and presented to the user 701 via the user device 702. However, in some instances it may be undesirable to have video content pre-generated for all of the potential aspect ratios (given the storage space requirements), to the video content may be modified dynamically to an aspect ratio that is suitable for a particular type of user device 702 in real-time or upon a request that is received to view the video content.

The aspect ratio for the video content may not be necessarily limited to being based on the type of device but may also be based on other parameters. For example, the aspect ratio also may be based on the manner in which the video content is accessed via the user device 702. Continuing this example, the aspect ratio or video content displayed via one website may be different than the aspect ratio for the same video content being displayed via another website based on the other contents that are presented via the different websites and the arrangement of such contents on the website. This may apply to any other mechanism by which the video content may be accessed, such as a smartphone application, desktop or laptop computer software, a smart television application, etc.

The computing system 704 may be a remote system that may also be used to perform some or all of the processing as described herein (however some or all of the processing may also be performed by the user device 702). The computing system 704 may host any of the machine learning models as described herein. The computing system 704 may include machine learning model(s) 706 (which may be the same as, or similar to, machine learning model 416 and/or any other machine learning model described herein). For example, the machine learning model(s) 706 may include a generative model, such as a stable diffusion model or any other type of generative model, which may be used to perform outpainting on existing video frames to modify video content to a different aspect ratio.

The database 710 may store any of the data that is used as described herein. For example, the database 710 may store any video content 712 that is to be presented to a user 701 via a user device 702. As aforementioned, the video content 712 may be stored in different aspect ratios for presentation via different types of user devices 702. The segments of video content, individual frames, etc. may also be stored in the database 710. The database 710 may also store any other relevant information described herein, such as masks, etc.

In one or more embodiments, any of the elements of the system 700 (for example, one or more user devices 702, one or more computing devices 704, one or more databases 710, and/or any other element described with respect to FIG. 7 or otherwise) may be configured to communicate via a communications network 750. The communications network 750 may include, but not limited to, any one of a combination of different types of suitable communications networks, such as, for example, broadcasting networks, cable networks, public networks (e.g., the Internet), private networks, wireless networks, cellular networks, or any other suitable private and/or public networks. Further, the communications network 750 may have any suitable communication range associated therewith and may include, for example, global networks (e.g., the Internet), metropolitan area networks (MANs), wide area networks (WANs), local area networks (LANs), or personal area networks (PANs). In addition, communications network 750 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements (for example, one or more user devices 702, one or more computing devices 704, one or more databases 710, and/or any other element described with respect to FIG. 7 or otherwise) of the system 700 may include any of the elements of the computing device 800 as well (such as the processor 802, memory 804, etc.).

Figure 8:
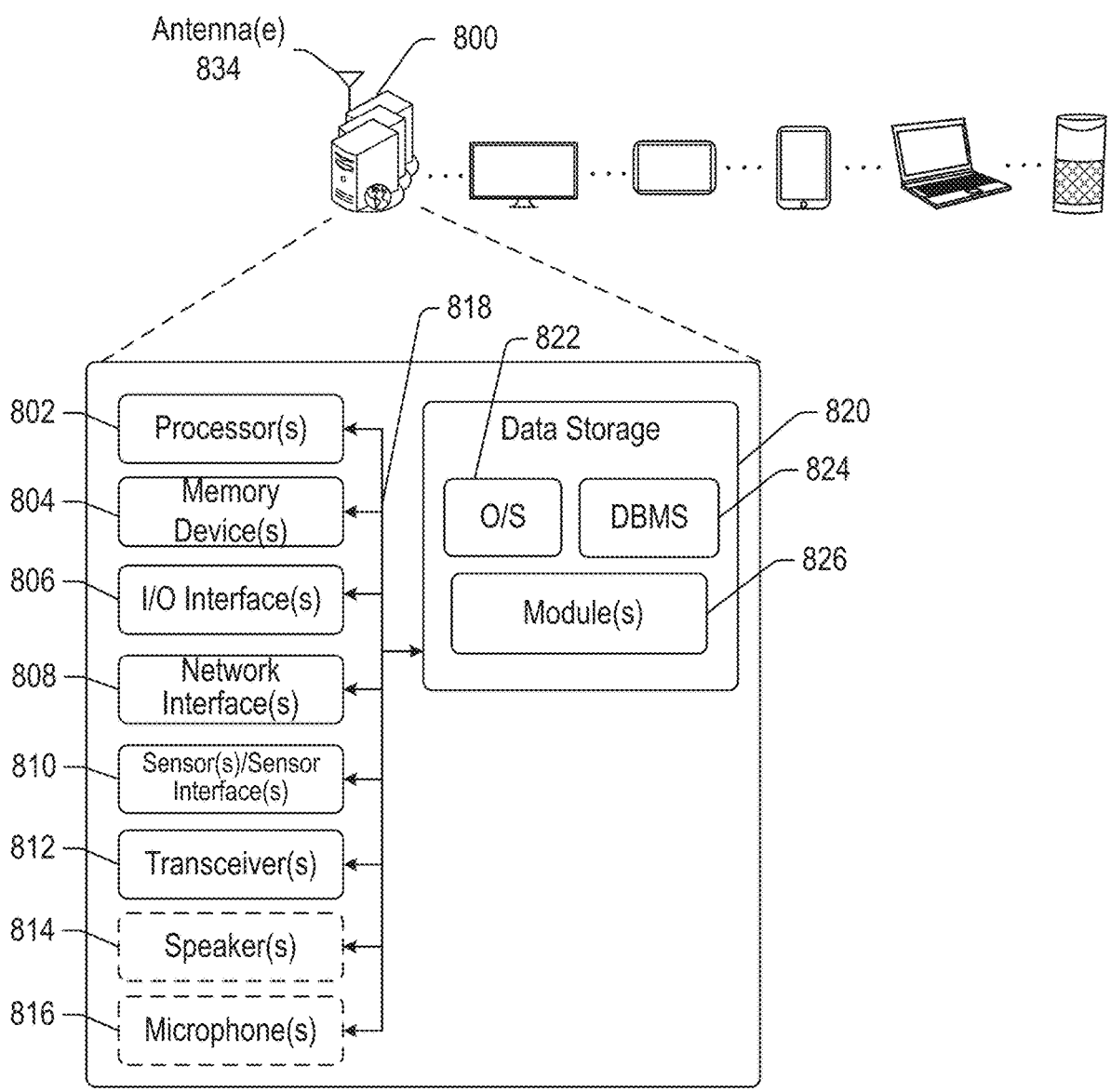
FIG. 8 depicts an example computing device, in accordance with one or more example embodiments of the disclosure.

FIG. 8 is a schematic block diagram of an illustrative computing device 800 in accordance with one or more example embodiments of the disclosure. The computing device 800 may include any suitable computing device capable of receiving and/or generating data including, but not limited to, a user device such as a smartphone, tablet, e-reader, wearable device, or the like; a desktop computer; a laptop computer; a content streaming device; a set-top box; or the like. The computing device 800 may correspond to an illustrative device configuration for the devices of FIGS. 1-7 (such as user device 702, computing device 704, etc.).

The computing device 800 may be configured to communicate via one or more networks with one or more servers, search engines, user devices, or the like. In some embodiments, a single remote server or single group of remote servers may be configured to perform more than one type of content rating and/or machine-learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 800 may include one or more processor(s) 802, one or more memory devices 804 (generically referred to herein as memory 804), one or more input/output (I/O) interface(s) 806, one or more network interface(s) 808, one or more sensors or sensor interface(s) 810, one or more transceivers 812, one or more optional speakers 814, one or more optional microphones 816, and data storage 820. The computing device 800 may further include one or more buses 818 that functionally couple various components of the computing device 800. The computing device 800 may further include one or more antenna (e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the computing device 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the computing device 800 may include volatile memory (memory that maintains its state when supplied with power), such as random access memory (RAM) and/or non-volatile memory (memory that maintains its state even when not supplied with power), such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of nonvolatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory, such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide nonvolatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804 and ultimately may be copied to data storage 820 for nonvolatile storage.

More specifically, the data storage 820 may store one or more operating systems (O/S) 822; one or more database management systems (DBMS) 824; and one or more program module(s), applications, engines, computer-executable code, scripts, or the like such as, for example, one or more module(s) 826. Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the computing device 800. Any data storage in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, the datastore(s) may include any of the data that is described as being stored in database 712 in FIG. 7, as well as any other data that is described herein.

The processor(s) 802 may be configured to access the memory 804 and execute computer-executable instructions loaded therein. For example, the processor(s) 802 may be configured to execute computer-executable instructions of the various program module(s), applications, engines, or the like of the computing device 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the module(s) 826 may include computer-executable instructions, code, or the like that responsive to execution by one or more of the processor(s) 802 may perform functions including, but not limited to, modifying the size of video content, etc.

Referring now to other illustrative components depicted as being stored in the data storage 820, the O/S 822 may be loaded from the data storage 820 into the memory 804 and may provide an interface between other application software executing on the computing device 800 and hardware resources of the computing device 800. More specifically, the O/S 822 may include a set of computer-executable instructions for managing hardware resources of the computing device 800 and for providing common services to other application programs (e.g., managing memory allocation among various application programs). In certain example embodiments, the O/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 800 is a user device, the DBMS 824 may be any suitable light-weight DBMS optimized for performance on a user device.

Referring now to other illustrative components of the computing device 800, the input/output (I/O) interface(s) 806 may facilitate the receipt of input information by the computing device 800 from one or more I/O devices as well as the output of information from the computing device 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna (e) 834 to connect to one or more networks via a wireless local area network (WLAN) (such as Wi-Fi) radio, Bluetooth, ZigBee, and/or a wireless network radio, such as a radio capable of communication with a wireless communication network, such as a Long-Term Evolution (LTE) network, WiMAX network, 3G network, ZigBee network, etc.

The computing device 800 may further include one or more network interface(s) 808 via which the computing device 800 may communicate with any of a variety of other systems, platforms, networks, devices, and so forth. The network interface(s) 808 may enable communication, for example, with one or more wireless routers, one or more host servers, one or more web servers, and the like via one or more of networks.

The antenna (e) 834 may include any suitable type of antenna depending, for example, on the communications protocols used to transmit or receive signals via the antenna (e) 834. Nonlimiting examples of suitable antennas may include directional antennas, non-directional antennas, dipole antennas, folded dipole antennas, patch antennas, multiple-input multiple-output (MIMO) antennas, or the like. The antenna (e) 834 may be communicatively coupled to one or more transceivers 812 or radio components to which or from which signals may be transmitted or received.

As previously described, the antenna (e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMAX, etc.), direct satellite communications, or the like.

The antenna (e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHz channels (e.g., 802.11n, 802.11ac), or 60 GHz channels (e.g., 802.11ad). In alternative example embodiments, the antenna (e) 834 may be configured to transmit or receive radio frequency signals within any suitable frequency range forming part of the unlicensed portion of the radio spectrum.

The antenna (e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna (e) 834—transmitting or receiving radio frequency (RF) signals in the bandwidth and/or channels corresponding to the communications protocols utilized by the computing device 800 to communicate with other devices. The transceiver(s) 812 may include hardware, software, and/or firmware for modulating, transmitting, or receiving—potentially in cooperation with any of antenna (e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computing device 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device, such as, for example, inertial sensors, force sensors, thermal sensors, and so forth. Example types of inertial sensors may include accelerometers (e.g., MEMS-based accelerometers), gyroscopes, and so forth.

The optional speaker(s) 814 may be any device configured to generate audible sound. The optional microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model, such as, for example, a client-server model, a peer-to-peer model, and so forth. In addition, any of the functionalities described as being supported by any of the program module(s) depicted in FIG. 8 may be implemented, at least partially, in hardware and/or firmware across any number of devices.

It should further be appreciated that the computing device 800 may include alternate and/or additional hardware, software, or firmware components beyond those described or depicted without departing from the scope of the disclosure. More particularly, it should be appreciated that software, firmware, or hardware components depicted as forming part of the computing device 800 are merely illustrative and that some components may not be present or additional components may be provided in various embodiments. While various illustrative program module(s) have been depicted and described as software module(s) stored in data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together, such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium that can be used to store the information and can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   receiving first video content including a first plurality of video frames, wherein at least some of the first plurality of video frames are of a first aspect ratio;
   separating, by one or more processors, the first video content into one or more segments, each of the one or more segments including a different camera cut of the first video content;
   identifying, by the one or more processors, a first segment of the one or more segments that includes a static camera cut;
   selecting, by the one or more processors, a first video frame of the first segment;
   creating, by the one or more processors, a video frame canvas that is a second aspect ratio that is different than first aspect ratio, wherein the video frame canvas includes a first set of pixels including the first video frame and a second set of pixels provided adjacent to a boarder of the first video frame;
   generating, by the one or more processors, a mask, the mask being a matrix including a first numerical value in a first set of positions in the matrix corresponding to a location of the first set of pixels and a second numerical value in a first set of positions in the matrix corresponding to a location of the second set of pixels;
   causing, by the one or more processors and using a machine learning model, and based on the first video frame canvas, the first video frame to be modified into a second video frame, wherein the second set of pixels are modified in the second video frame to provide an appearance of the first video frame being of the second aspect ratio;
   producing, by the one or more processors, a third video frame by overlaying the first video frame on the second video frame received from the machine learning model;
   causing, by the one or more processors and using the machine learning model, the third video frame to be modified into a fourth video frame;
   determining, by the one or more processors, that the machine learning model has generated an output video frame a threshold number of times; and
   combining, based on the determination that the machine learning model has generated an output video frame a threshold number of times, output video frames generated by the machine learning model to produce second video content at the second aspect ratio.

2. The method of claim 1, further comprising:
   receiving third video content including a second plurality of video frames, wherein the third video content is provided at a third aspect ratio that is different than the first aspect ratio of the first video content;
   generating, by the one or more processors, a second video frame canvas including a first video frame of the second video content to the machine learning model;
   causing, by the one or more processors and from the machine learning model, the first video frame of the second video content to be modified into a second video frame of the second video content, wherein the second video frame of the second video content provides an appearance of the second video frame being of the second aspect ratio; and
   combining the first video frame and the second video frame.

3. The method of claim 1, further comprising:
   selecting, by the one or more processors, a border width of the border;
   determining, by the one or more processors, a maximum pixel difference between pixels in the border of neighboring frames in the first segment; and
   determining, by the one or more processors, that the maximum pixel difference is less than a threshold value, wherein the neighboring frames are both provided to the machine learning model based on the maximum pixel difference being less than the threshold value.

4. The method of claim 1, wherein the machine learning model is stable diffusion model.

5. A method comprising:
   receiving, by one or more processors, first video content including a first plurality of video frames, wherein at least some of the first plurality of video frames are of a first aspect ratio;
   separating, by the one or more processors, the first video content into one or more segments;
   identifying, by the one or more processors, a first segment of the one or more segments that includes video frames in which pixels forming a border of the video frames remain static across the video frames;
   selecting, by the one or more processors, a first video frame of the first segment;
   creating, by the one or more processors, a first video frame canvas that is a second aspect ratio that is different than the first aspect ratio, wherein the first video frame canvas includes a first set of pixels including the first video frame and a second set of pixels located adjacent to a border of the first video frame; and
   causing, by the one or more processors, using a machine learning model, and based on the first video frame canvas, the first video frame to be modified into a second video frame, wherein the second set of pixels are modified in the second video frame to provide an appearance of the first video frame being of the second aspect ratio.

6. The method of claim 5, further comprising:
producing, by the one or more processors, a third video frame by overlaying the first video frame on the second video frame received from the machine learning model;
causing, by the one or more processors, the third video frame to be modified into a fourth video frame by the machine learning model.

7. The method of claim 5, further comprising:
generating, by the one or more processors, a mask, the mask being a matrix including a first numerical value in a first set of positions in the matrix corresponding to a location of the first set of pixels and a second numerical value in a second set of positions in the matrix corresponding to a location of the second set of pixels,
wherein causing the first video frame to be modified is further based on the mask.

8. The method of claim 5, wherein the first video frame of the first segment is a middle video frame of one or more video frames comprising the first segment.

9. The method of claim 5, wherein the one or more segments each include a different camera cut of the first video content.

10. The method of claim 5, further comprising:
receiving second video content including a second plurality of video frames, wherein the second video content is provided at a third aspect ratio that is different than the first aspect ratio of the first video content;
generating, by the one or more processors, a second video frame canvas including a first video frame of the second video content to the machine learning model;
causing, by the one or more processors and using the machine learning model, the first video frame of the second video content to be modified into a second video frame of the second video content, wherein the second video frame of the second video content provides an appearance of the second video frame being of the second aspect ratio; and
combining the first video frame and the second video frame.

11. The method of claim 5, further comprising:
selecting, by the one or more processors, a border width of the border;
determining, by the one or more processors, a maximum pixel difference between pixels in the border of neighboring frames in the first segment; and
determining, by the one or more processors, that the maximum pixel difference is less than a threshold value, wherein the neighboring frames are both provided to the machine learning model based on the maximum pixel difference being less than the threshold value.

12. The method of claim 5, wherein the machine learning model is diffusion model.

13. A system comprising:
memory that stores computer-executable instructions; and
one or more processors configured to access the memory and execute the computer-executable instructions to:
receive first video content including a first plurality of video frames, wherein at least some of the first plurality of video frames are of a first aspect ratio;
separate the first video content into one or more segments;
identify a first segment of the one or more segments that includes video frames in which pixels forming a border of the video frames remain static across the video frames;
select a first video frame of the first segment;
create a first video frame canvas that is a second aspect ratio that is different than the first aspect ratio, wherein the first video frame canvas includes a first set of pixels including the first video frame and a second set of pixels located adjacent to a boarder of the first video frame; and
cause, using a machine learning model, and based on the first video frame canvas, the first video frame to be modified into a second video frame, wherein the second set of pixels are modified in the second video frame to provide an appearance of the first video frame being of the second aspect ratio.

14. The system of claim 13, wherein the one or more processors are further configured to execute the computer-executable instructions to:
produce a third video frame by overlaying the first video frame on the second video frame received from the machine learning model; and
cause the third video frame to be modified into a fourth video frame by the machine learning model.

15. The system of claim 13, wherein the one or more processors are further configured to execute the computer-executable instructions to:
generate a mask, the mask being a matrix including a first numerical value in a first set of positions in the matrix corresponding to a location of the first set of pixels and a second numerical value in a second set of positions in the matrix corresponding to a location of the second set of pixels,
wherein causing the first video frame to be modified is further based on the mask.

16. The system of claim 13, wherein the first video frame of the first segment is a middle video frame of one or more video frames comprising the first segment.

17. The system of claim 13, wherein the one or more segments each include a different camera cut of the first video content.

18. The system of claim 13, wherein the one or more processors are further configured to execute the computer-executable instructions to:
receive second video content including a second plurality of video frames, wherein the second video content is provided at a third aspect ratio that is different than the first aspect ratio of the first video content;
generate a second video frame canvas including a first video frame of the second video content to the machine learning model;
cause, using the machine learning model, the first video frame of the second video content to be modified into a second video frame of the second video content, wherein the second video frame of the second video content provides an appearance of the second video frame being of the second aspect ratio; and
combine the first video frame and the second video frame.

19. The system of claim 13, wherein the one or more processors are further configured to execute the computer-executable instructions to:
select a border width of the border;
determine a maximum pixel difference between pixels in the border of neighboring frames in the first segment; and determine that the maximum pixel difference is less than a threshold value, wherein the neighboring frames are both provided to the machine learning model based on the maximum pixel difference being less than the threshold value.

20. The system of claim 13, wherein the machine learning model is stable diffusion model.

* * * * *